(12) United States Patent
Ottaway

(10) Patent No.: US 6,914,226 B2
(45) Date of Patent: Jul. 5, 2005

(54) OVEN FOR HEATING A PRODUCT WITH RF ENERGY

(75) Inventor: Steven Thomas Ottaway, Yateley (GB)

(73) Assignee: Comdel, Inc., Gloucester, MA (US)

( * ) Notice: Subject to any disclaimer, the term of this patent is extended or adjusted under 35 U.S.C. 154(b) by 0 days.

(21) Appl. No.: 10/433,634

(22) PCT Filed: Dec. 5, 2001

(86) PCT No.: PCT/US01/46644
§ 371 (c)(1),
(2), (4) Date: Jun. 3, 2003

(87) PCT Pub. No.: WO02/45516
PCT Pub. Date: Jun. 13, 2002

(65) Prior Publication Data
US 2004/0016744 A1 Jan. 29, 2004

Related U.S. Application Data
(60) Provisional application No. 60/251,259, filed on Dec. 5, 2000.

(51) Int. Cl.[7] .............................. H05B 6/50; H05B 6/60
(52) U.S. Cl. ........................ 219/775; 219/776; 219/779; 219/780; 99/358; 99/451; 422/22; 34/254; 426/244
(58) Field of Search ................................ 219/775, 776, 219/778–780, 770, 771; 99/358, 451, DIG. 14; 426/244; 422/22; 34/250–254

(56) References Cited

U.S. PATENT DOCUMENTS

| | | | | |
|---|---|---|---|---|
| 2,512,311 A | * | 6/1950 | Davis | 219/775 |
| 2,546,004 A | * | 3/1951 | Kinn | 219/776 |
| 4,221,950 A | * | 9/1980 | Lamberts et al. | 219/765 |
| 4,257,167 A | * | 3/1981 | Grassman | 34/256 |
| 4,567,340 A | * | 1/1986 | Latchum, Jr. | 219/701 |
| 4,974,503 A | * | 12/1990 | Koch | 99/451 |
| 5,942,146 A | * | 8/1999 | Blaker et al. | 219/770 |

* cited by examiner

Primary Examiner—Philip H. Leung
(74) Attorney, Agent, or Firm—Philip O. Post

(57) ABSTRACT

RF energy provided by electrodes positioned between a product is used to heat a product that exhibits a variable impedance during the heating process. As the product's impedance changes during the heating process, RF heating system impedance can be maintained constant by adjusting the distance between the electrodes, adjusting the impedance of a variable impedance device connected between the RF power source and an electrode, or a combination of electrode distance adjustment and impedance adjustment of the variable impedance device. The system is particularly applicable to the heating or pasteurization of bulk food products with multiple heating zones.

16 Claims, 6 Drawing Sheets

OVEN FOR HEATING A PRODUCT WITH RF ENERGY

CROSS-REFERENCE TO RELATED APPLICATIONS

This application claims the benefit of U.S. Provisional Application No. 60/251,259 filed Dec. 5, 2000.

BACKGROUND OF THE INVENTION

1. Field of the Invention

The present invention relates to a conveyor oven using RF energy to heat a product as it moves through the oven.

2. Description of Related Art

Various types of conveyor ovens are used for cooking large volumes of products such as meat, fish or poultry, or for pasteurizing pre-packed products.

Conveyor ovens known in the art use a variety of heat sources to transfer heat to a product as it moves through the oven. For example, in a hot oil system, a pair of upper and lower platens are heated to a pre-selected temperature, typically in the range of 280° C., by means of recirculated oil that may be heated by an electric, steam or other source of heat energy. Separate conveyor belts are engaged by the upper pair of platens and the lower pair of platens, whereby the heat contained in the platens is transferred to the belts. Product is transported between the upper and lower platens and conveyor belts to heat the product. When the upper and lower platens are adjusted to be sufficiently close to each other they will effectively press a flat product such as bacon to prevent distortion or curling of the product. Alternatively, in a hot air system, heated air can be used to heat a "tunnel" formed between the upper and lower platens and belts to heat product as it passes through the formed tunnel. In an infrared heating system, an infrared energy source can be used to heat the product passing through the tunnel. Common to all of the aforementioned heating systems is the transfer of heat from the system to the outer surface of the product by convection. Internal heating of the product is by the conduction of heat through the product from its surface. Consequently, the thermal transfer properties of the product, and packaging, if the product is packaged prior to heating, are significant in determining the time-temperature heating profile for the product.

A well-known alternative to the above methods of convection heating is the direct application of microwave energy to the product within the range of approximately 915 MHz (typical commercial or industrial applications) and 2.4 GHz (typical for consumer or domestic applications). Lower frequencies, most notably 13.56 MHz and 27.12 MHz have been used for static (non-conveyor) baking and moisture leveling control, but not for high volume cooking of meat, fish, poultry and the like, or pasteurization of pre-packaged food products. Microwave energy excites molecules of water, fats, sugars and other components within a food product. The molecular excitation generates heat that is transferred to the product throughout its thickness. A magnetron is typically used as the energy source for the microwave energy. Magnetrons have a relatively short life in comparison with transistors or triodes used as energy sources in RF amplifiers. Since microwave energy generated by a magnetron is directed energy, placement of the magnetron relative to the product in the oven so as to ensure consistent neating throughout the product is problematic. There are also health and safety issues inherent with the use of high power microwave sources.

Pasteurization of food product, either pre-packaged or prior to packaging, involves keeping the food product throughout its volume at a pre-selected temperature, typically around 80° C. For a pre-packaged product, the product is passed through a water bath that is keep at the pre-selected temperature. As with the conduction heating methods described above, heat must be transferred by conduction from the water to the core of the product. Additionally some means of drying the packaging, such as a series of high pressure fans, must be utilized after the pasteurization process is complete. When the packaging is not a vacuum seal, air within the sealed packaging serves as a poor thermal conductor between the water bath and the product in the package.

Therefore, there exists the need for apparatus and a method of heating or pasteurization of a product that uses electromagnetic energy in frequency ranges below the microwave spectrum with a maximum power density and optimized operating frequency preferably within unlicensed Industrial, Scientific and Medicine (ISM) frequency bands.

BRIEF SUMMARY OF THE INVENTION

In its broadest aspect, the present invention is an apparatus and a method for heating a product having variable impedance in a conveyor oven. The product is conveyed between one or more pairs of electrodes through one or more heating zones. An RF energy source supplies power to each of the one or more pairs of electrodes via a variable impedance device. In one mode of the invention, as the impedance of the product varies whilst it is conveyed through the heating zone, the impedance of the variable impedance device changes to maintain a constant impedance between each of the one or more pairs of electrodes. These and other aspects of the invention are set forth in the specification and appended claims.

BRIEF DESCRIPTION OF THE SEVERAL VIEWS OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
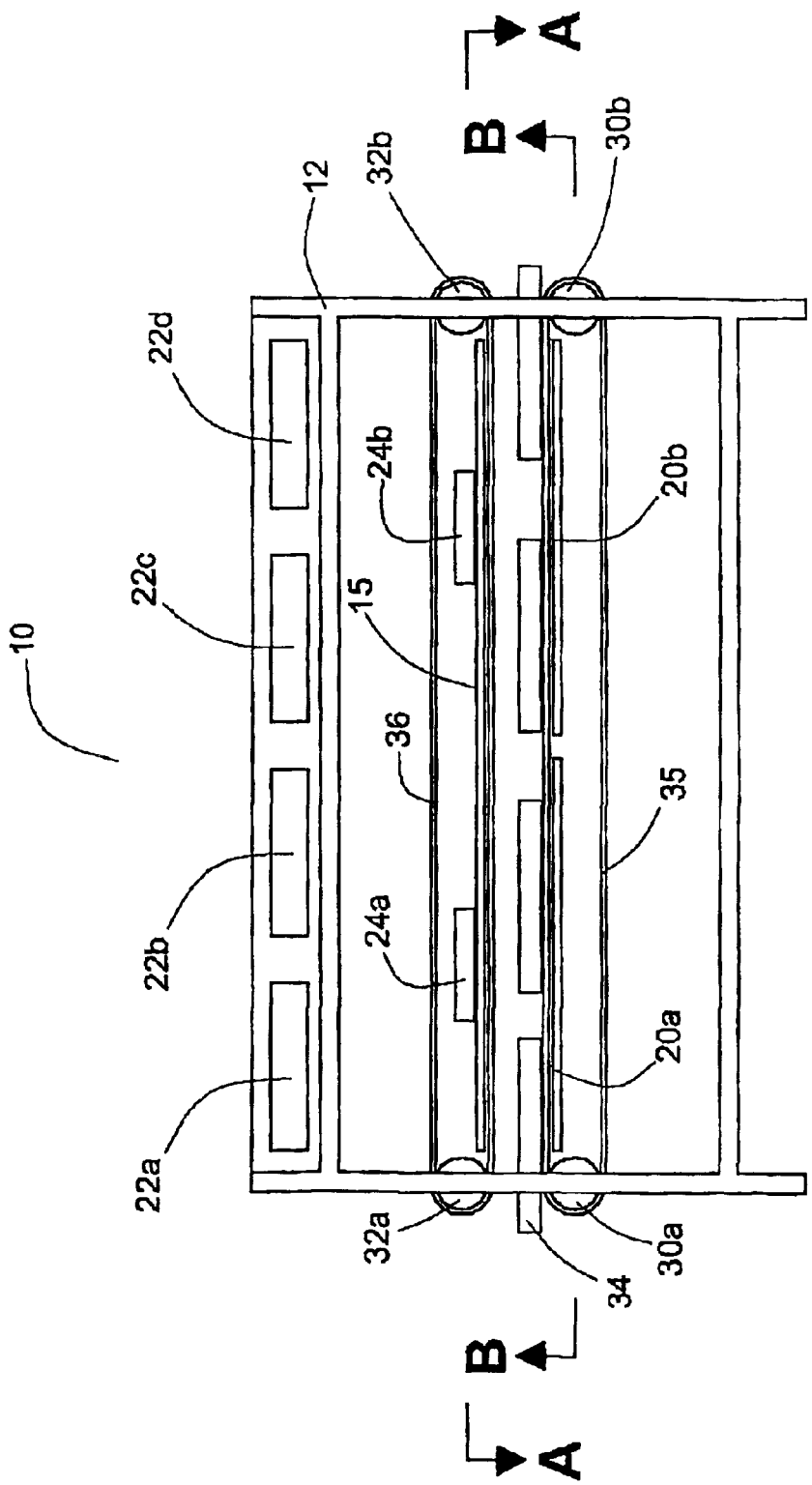
FIG. 1 is a front elevational view of one example of an RF energy conveyor oven of the present invention.
Figure 2:
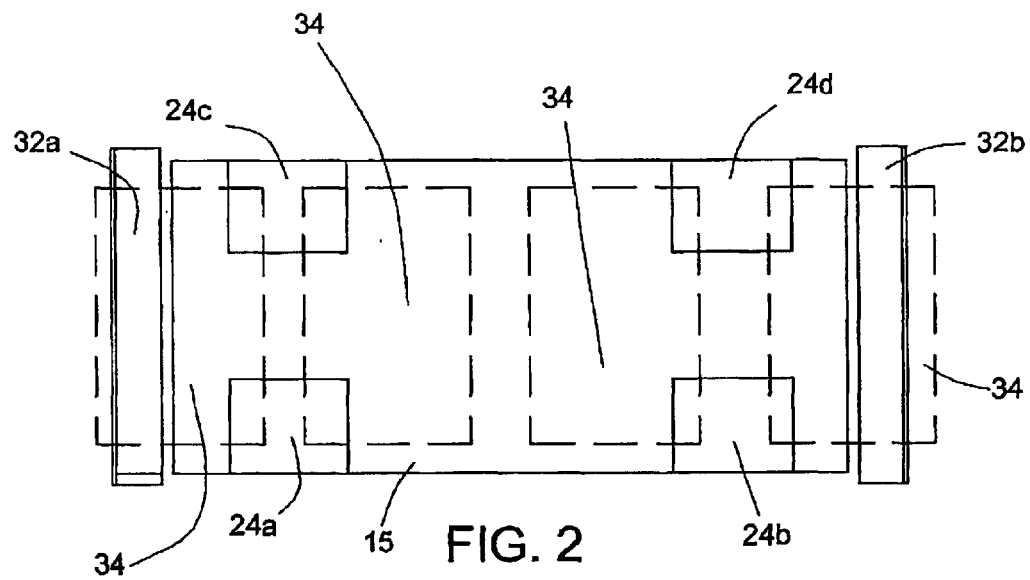
FIG. 2 is a cross-sectional view of an RF energy conveyor oven with sectioning plane defined by line A—A in FIG. 1
Figure 3:
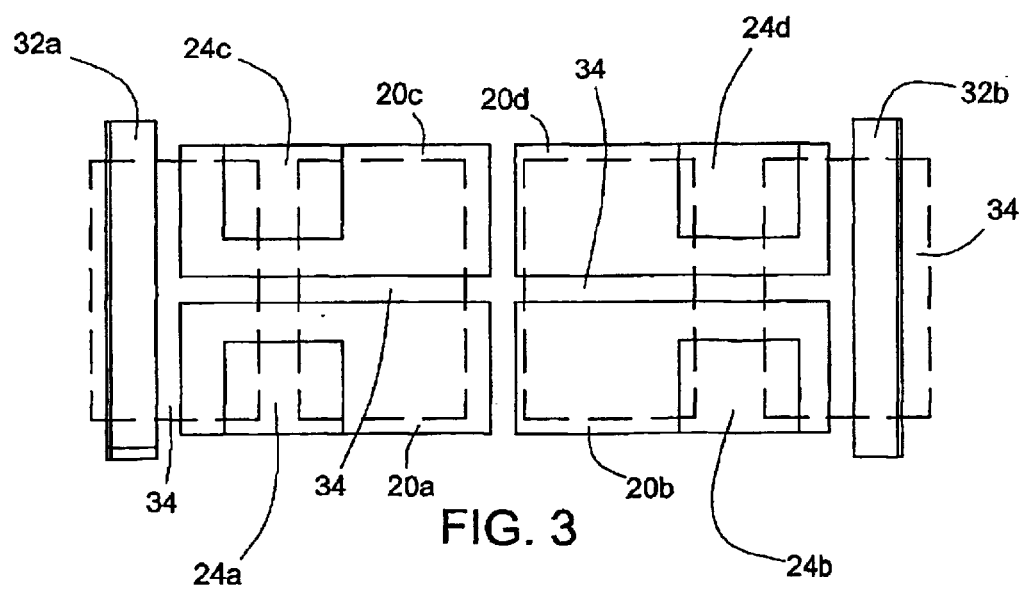
FIG. 3 is a cross-sectional view of an RF energy conveyor oven with sectioning plane defined by line B—B in FIG. 1

There is shown in FIG. 1 through FIG. 3, a first example of a RF energy conveyor oven 10 of the present invention. RF, an abbreviation for radio frequency, is used is this specification to describe a frequency band lower than the microwave band of the electromagnetic spectrum and generally, but not limiting, within the range of from 3 MHz to 300 MHz. Whilst preferred RF frequencies are used in the following examples of the invention they do not limit the scope of the invention. Oven 10 can include a plurality of discrete RF energy heating zones with each zone having an RF operating frequency that is not necessarily the same in all zones. In this example, first electrode 15 is a ground potential electrode and second electrodes 20a, 20b, 20c and 20d, are high potential electrodes. The ground and high potential electrodes are generally of a thin plate design (e.g., 10 to 15 mm thick) that could be coated with a thermally isolating and low friction material such as TEFLON. Suitable electrodes may be in other shapes, such as but not limited to, rectangular or cylindrical rods. Each of the four high potential electrodes defines a discrete heating zone for heating product 34 (shown diagrammatically in the figures and in dashed lines in FIG. 2 and FIG. 3) as it moves through the oven. Although a common ground potential electrode 15 is used in the figures, discrete ground electrodes, as well as discrete high potential electrodes, may be provided in each heating zone. A common ground plane aids in reducing cross coupling and interference between RF energy sources (further described below) that supply energy to the electrodes. Whilst the RF conveyor oven 10 in the figures has four heating zones, other examples of the invention may use a different number of zones, including a single zone, depending upon the configuration of the oven and product to be heated. Multiple heating zones achieve a more even heating across the entire width of the rollers and conveyor belt.

Further, as the product is conveyed through the oven 10, the impedance of the product decreases as described below. In terms of the dielectric property of the product, the dielectric loss angle is decreasing. This may be compensated for by using, for example, higher frequencies in progressive (relative to forward travel of the product through the oven) zones since the dielectric loss angle of a given material is proportional to the applied frequency.

Lower rollers 30a and 30b drive lower conveyor belt 35 by conventional drive means (e.g., an electric drive not shown in the drawings). Similarly, upper rollers 32a and 32b drive upper conveyor belt 36 by conventional drive means. Product 34 is moved through the channel formed by the upper and lower rollers and conveyor belts as it sits upon the lower conveyor belt. The channel defines a heating path for the oven.

For some products, it may be desirable to have the upper conveyor belt press down upon the product to achieve a pressing effect on the product. In this configuration, rollers 30a, 30b, 30c and 30d are modified to perform as platens as previously described above. However, since the RF energy conveyor oven 10 does not depend upon thermal heat transfer from platens to the product, the upper drive rollers 32a and 32b and upper conveyor belt can be maintained at a distance from the product. In this configuration, conventional drive means are provided to vary the distance between the pairs of upper and lower rollers and belts, and consequently, the height of the channel through which product 34 passes. Further, in such applications, the upper pair of rollers and upper conveyor belt may be eliminated. However, the upper belt performs a hygienic function by keeping the top of the heating tunnel enclosed.

Figure 4:
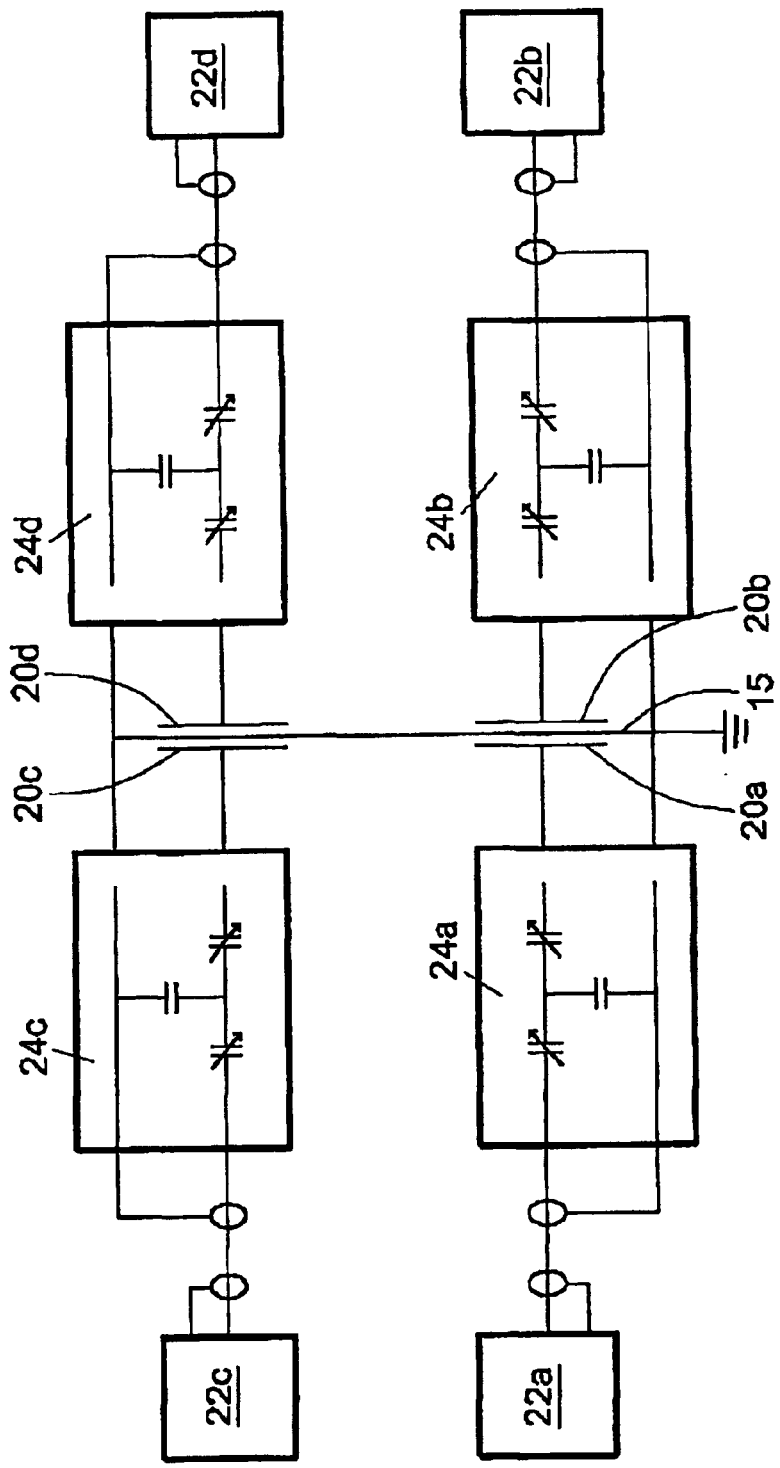
FIG. 4 is a simplified schematic diagram of one example of a power circuit for an RF energy conveyor oven of the present invention.

RF energy sources 22a, 22b, 22c and 22d, provide power to second electrodes 20a, 20b, 20c and 20d respectively, via a variable impedance device 24a, 24b, 24c and 24d, respectively. The simplified schematic representation of this power circuit is shown in FIG. 4. Arrangement of the RF energy sources, variable impedance devices and electrodes, and means of interconnecting, which are known in the art, will vary depending upon a particular conveyor oven arrangement and are contemplated as being within the capabilities of a skilled artisan who is practicing the invention.

Suitable RF energy sources are crystal controlled power amplifier such as COMDEL, INC., Gloucester, Mass., USA, Part CX3500/40.68.

For fixed position electrodes, dynamic system load impedance (across the zone's high potential electrode and ground electrode) in each one of the four heating zones is the combined impedance, at any instance of time, of the variable impedance device serving the zone and of product 34.

A power circuit for the oven of the present invention may be formed in many alternative configurations without deviating from the scope of the invention. In one form, a power source having an RF power output is connected to a single variable impedance device, and one first and one second electrode. Alternatively, a single power source may be connected to multiple variable impedance device, and multiple first and second electrodes depending upon the heating process that is desired for a particular oven configuration.

When product 34 is a food product, instantaneous impedance of the product as it moves through a heating zone is a function of the product's ingredient content, such as fats, salt and water, and the density of the product (i.e., the dimensions of each product and the spacing between multiple products) in a heating zone. Since ingredient content will change as the product progresses through the oven (for example, evaporation of water or release of fats), the impedance of the product will vary as it passes through a heating zone. As the impedance of product 34 changes, the impedance of the variable impedance device serving the zone can be arranged to automatically change so that a substantially constant dynamic system load impedance is maintained in the heating zone. A suitable variable impedance device can be fabricated by a skilled artisan from standard parts known in the industry. Each variable impedance device shown in FIG. 4 for one example of the invention uses two adjustable and one fixed capacitance components. In other examples, other arrangements of adjustable and fixed impedance components, including, but not limited to, capacitive and inductive devices, may be used to achieve a satisfactory variable impedance for use with a product having a particular, range of dynamic impedance characteristics.

Further in accordance with the present invention, unlike conventional microwave ovens, the distance between the high and ground potential electrodes may be varied to affect the dynamic system impedance in a heating zone by varying the system capacitance. With the combined impedance adjusting features of variable electrode separation and the variable impedance of the variable impedance device, the pair of high and ground potential electrodes may be brought very close to each other without creating a potential arcing hazard between the electrodes. Thus the present invention will keep a thin food product, such as a bacon strip, that is conveyed between the electrode pair relatively flat, with no distortion or curling.

Figure 5:
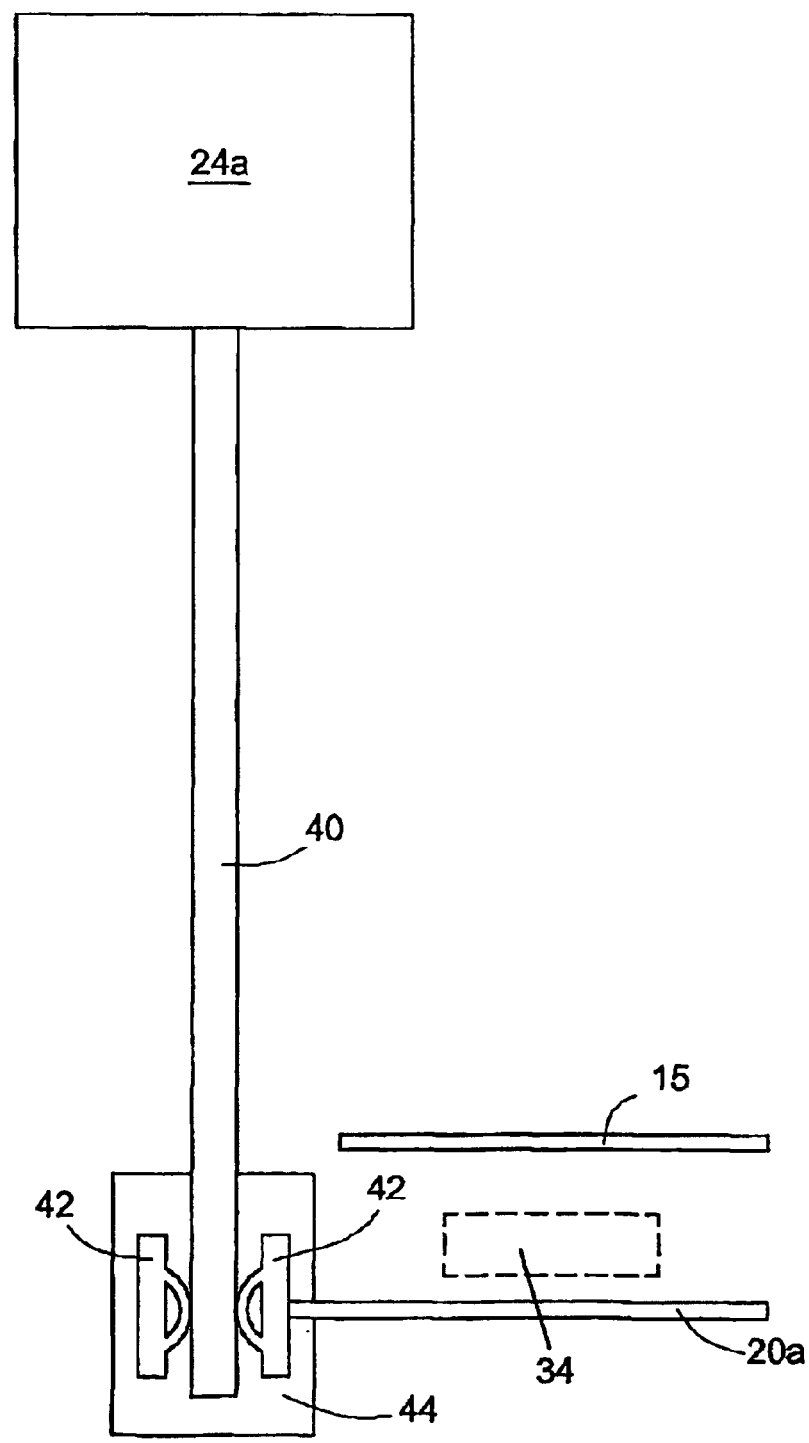
FIG. 5 is an elevational view of one example of a position adjusting apparatus for an electrode used with an RF energy conveyor oven of the present invention.

One arrangement for varying the distance between the electrodes with an adjustable length feeder apparatus is shown in FIG. 5. In each heating zone, feeder 40 is connected at one end to the output of the zone's variable impedance device, such as device 24a shown in FIG. 5. Spring contacts 42, mounted on block 44, engage feeder 40 to provide a means for an adjustable connection to the feeder that can vary the active circuit length of the feeder between the output of variable impedance device 24a and spring contacts 42. The zone's high potential electrode, in this instance, electrode 20a is in contact with spring contacts 42 in a manner to complete a circuit with the active circuit length of feeder 40. Conventional drive means (not shown in the drawings) are provided to raise or lower the high potential electrode and thereby adjust the distance between the high potential and ground electrodes. This adjustment will vary both the capacitance (raising or lowering the high potential electrode will decrease or increase capacitance, respectively) and inductance (shorter or longer distance of the active circuit length of the feeder and spring contacts will decrease or increase inductance, respectively). A suitable, but not limiting, range for achievable electrode separation is on the order of 3 to 30 mm. For greater separation or in alternative embodiments, multi-stage variable electrode separation apparatus can be provided. For example, in a two-stage system, the apparatus in FIG. 5 would serve as a first stage with the exception that variable impedance device 24a is replaced with a second pair of spring contact fingers, which, in turn, would engage a second feeder that would be connected at its opposing end to the variable impedance device.

Figure 6:
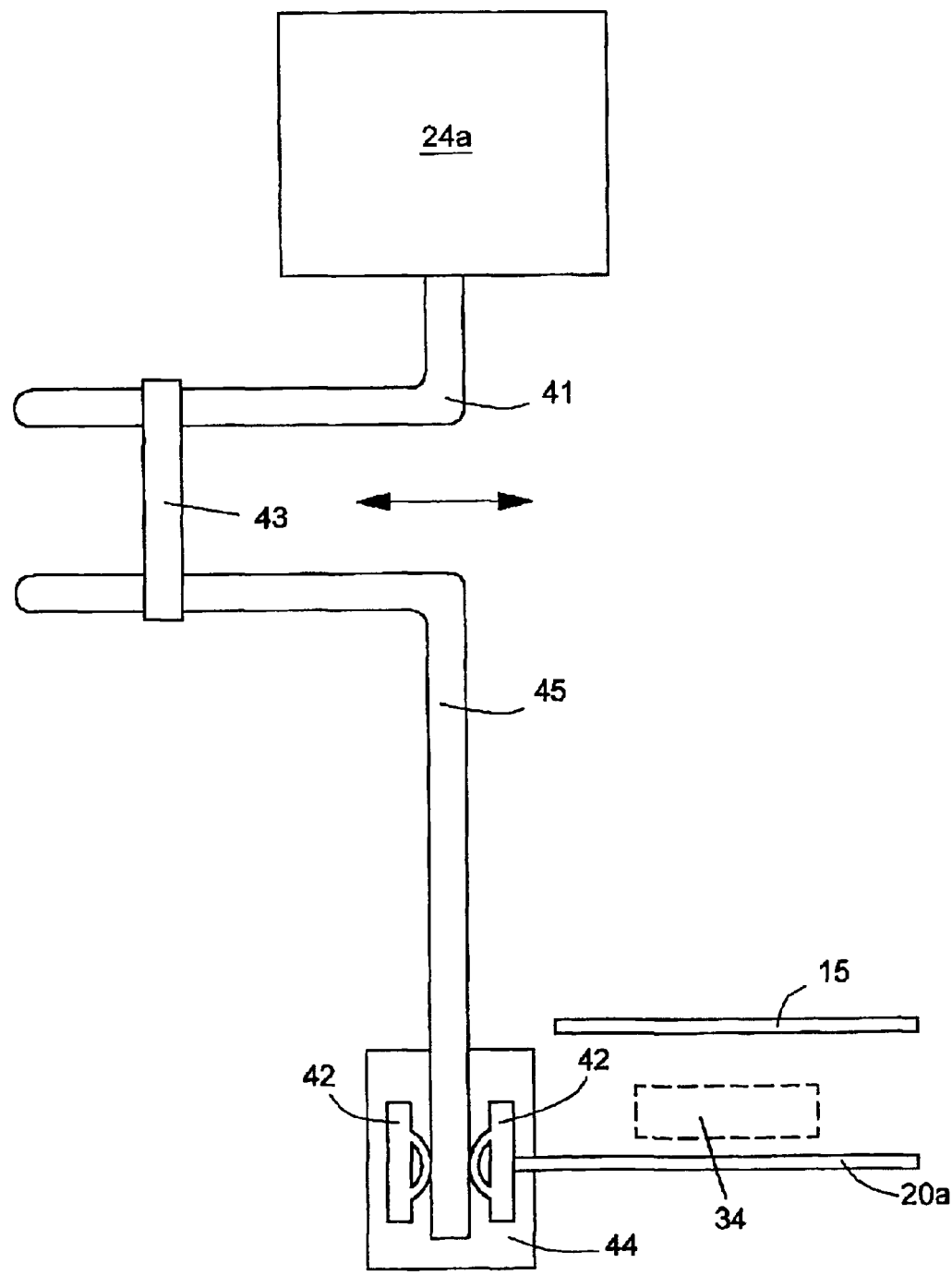
FIG. 6 is an elevational view of another example of a position adjusting apparatus for an electrode used with an RF energy conveyor oven of the present invention.

FIG. 6 illustrates an alternative arrangement for varying the distance between the electrodes. First feeder element 41 is adjustably connected to second feeder element 45 by third feeder element 43. In the particular arrangement shown in FIG. 6, third feeder element 43 is slidably connected to first and second feeder elements 41 and 45 so that it can be moved in either direction indicated by the arrows. Movement can be achieved by suitably connecting third feeder element 43 to a conventional servomotor. Control of the movement can be incorporated into the control and monitoring of the overall heating process as further described below. As with the adjustable electrode apparatus in FIG. 5, an electrode, such as high potential electrode 20a, can be moved towards or away from ground electrode 15 to accommodate product 34 of varying heights. In this arrangement the adjustable feeder length feature provided by slidable third feeder element 43 allows for additional adjustment in inductance when, for example, the magnitude of RF voltage across the electrode array or feed system changes after the distance between electrodes 20a and 15 has been set. Although FIG. 6 illustrates the adjustable inductance feature of slidable third feeder element 43 in combination with the adjustable electrode separation feature of FIG. 5, the adjustable inductance feature of slidable third feeder element 43 can also be used in conveyor ovens where the distance between high potential and ground electrodes is non-adjustably fixed.

Experimentation with an RF conveyor oven of the present invention wherein the product was a beef burger revealed that an operating power frequency of 40.680 MHz was suitable for achieving a temperature of 80° C. in the core of the product. Other suitable but non-limiting operating power frequencies are 13.560 MHz and 27.120 MHz.

That particular frequency was selected since it is within an ISM band and the beef burger achieved the stated core temperature in the fastest time for tested frequencies within an ISM band. ISM bands are internationally allocated. In the United States, ISM band allocation is detailed in Title 47 of the Code of Federal Regulations. As the product is heated, water and fat are released from the product by evaporation and drippings. The decrease in water and fat molecules in the product (decreased impedance) makes the product more difficult to heat by electromagnetic wave radiation. If a random impedance RF energy oven is used, the voltage between the electrodes will steadily increase to a point that electrical arcing between the electrodes becomes a potential hazard.

For some products a post RF energy "soaking" stage may be required to allow greater uniformity of temperature throughout the product as the localized heat generated by the RF energy dissipates.

Figure 7:
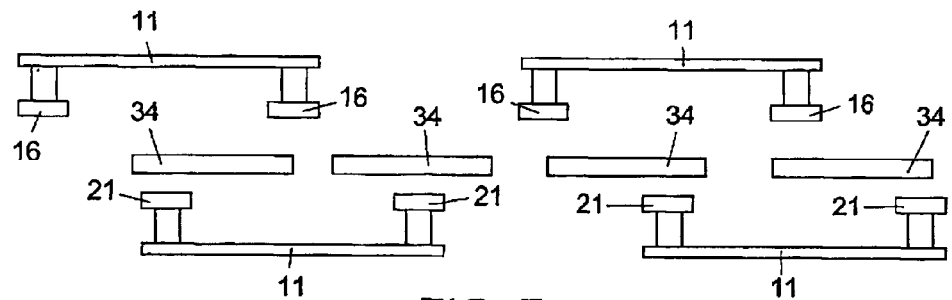
FIG. 7 is a side elevational view of one alternative arrangements of electrodes for use with an RF energy conveyor oven of the present invention.
Figure 8:
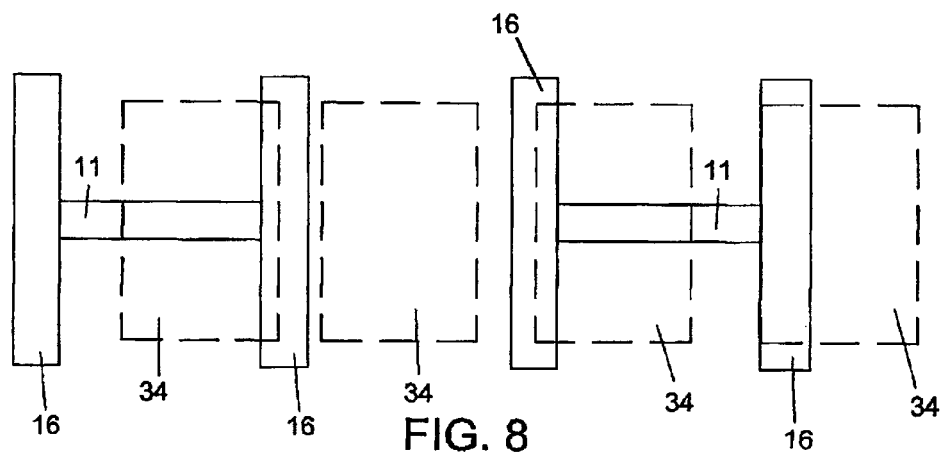
FIG. 8 is a plan view of a first or upper set of electrodes illustrated in FIG. 7.
Figure 9:
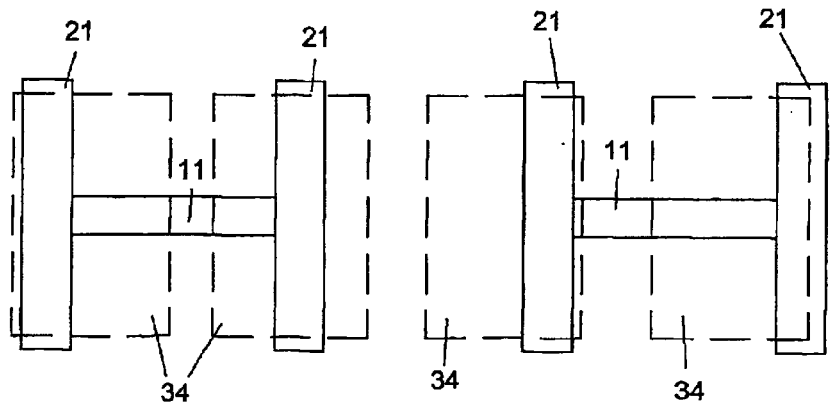
FIG. 9 is a plan view of a second or lower set of electrodes illustrated in FIG. 7.

An alternative arrangement of electrodes for a conveyor oven of the present invention is illustrated in FIG. 7 through FIG. 9 In this arrangement, first electrodes 16, which may be ground electrodes, are arranged in a staggered configuration relative to second electrodes 21, which may be high potential electrodes. In this alternative example of the invention, electrodes 16 and 21 are generally in the shape of bars which is a suitable alternative form for the electrodes in all embodiments of the invention. Other shapes, such as rod-shaped electrodes, can also be used. Further as illustrated in the example of the present invention in FIG. 7 through FIG. 9, two or more first electrodes 16, and two or more second electrodes 21, may be mounted on a common support assembly 11. The staggered field distribution produced by this arrangement of electrodes particularly enhances energy transfer efficiency when used with thin product having a low thermal mass, such as beef burgers and bacon strips. Staggering or offsetting the first and second electrodes in this manner results in generating a skewed RF energy distribution between the first and second electrodes. Improved energy transfer efficiency is due to the more focused nature of the applied field, which leads to a higher field density that results in an increased temperature gradient in the product. As product 34 passes between the first pair of upper and lower staggered electrodes, the field density in the product increases to a maximum and then decreases to a minimum. Product 34 is repeatedly exposed to this varying field density as it passes through each successive pair of upper and lower staggered electrodes. This field exposure cycling enhances thermal penetration and alleviates surface overheating to ensure a more uniform heat pattern throughout the cross section of the product. The staggered arrangement of electrodes also assists in reducing stray capacitance at higher operating frequencies. Minimum stray capacitance is a desired design constraint since increased inductance will lead to an increased circuit Q-factor that results in high voltage and tuning frequencies.

As with the non-staggered arrangement of electrodes, it may be beneficial to use a number of RF energy heating zones. Each zone could have an independent power supply and matching system to achieve fine process control. By way of example, and not as a limitation of the invention, the first heating zone could operate at a medium power level; the second heating zone could operate at a high power level; and the final heating zone or zones could operate at a low power level. In this particular arrangement of power levels for the heating zones, the first (medium power) heating zone could be used to overcome thermal inertia of the product. The second (high power) heating zone could be used to rapidly raise the temperature of the pre-warmed product to that sufficient for cooking to take place. The final (low power) single or multiple heating zones could allow the temperature of the product to level out throughout the cross section of the product.

The principle components that are required to practice the present invention, such as the electrodes, variable impedance devices, RF power supplies and drive systems for the moveable electrodes are sufficiently discrete and compact so that they may be configured for retrofit into existing conveyor ovens. Conversion of a hot oil conveyor to an RF energy conveyor oven of the present invention would result in a significant decrease in heating time whilst allowing the heating of the product to a much higher temperature at the expenditure of less energy. In alternative applications, the RF energy conveyor oven of the present invention may serve as a pre-heat or post-heat stage to an existing conventional conveyor oven to increase the production rate, or replace several conventional conveyor oven stages to decrease energy consumption and overall oven footprint per unit production.

For pasteurization, the above process is modified to maintain the temperature of the product at a pre-selected temperature for a pre-selected period of time. As with the above heating process, the lower frequency RF energy is capable of holding the product at a more even temperature throughout its entire volume than higher microwave energy. Further, in terms of the relative dielectric properties of packaging (a relatively small dielectric loss angle of less than one degree for packaging such as dry paper or polystyrene) and a pre-packaged product (a relatively large dielectric loss angle for product such as steak (nominally around 88° C.) and suet (nominally around 43° C.), only the product will be significantly heated. This means that no energy is lost in heating the air or packaging, or drying the package as required with heating by a water bath. The staggered arrangement of electrodes is of particular value for pasteurization because of the increased temperature gradient that can be achieved. With staggered electrodes a shorter length is required for the conveyor path for the pasteurization oven and less energy is consumed.

Control and monitoring of the heating process in the RF conveyor oven 10 can be accomplished by use of a microprocessor or a programmable logic controller installed in a suitable location on the oven. RF power control is of the closed loop type, with feedback from one or more oven operating parameters such as delivered power, electrode voltage, oven temperature at selected points, oven operating time and conveyor belt speed. Process monitoring can include data storage and evaluation of real time operating parameters to automatically adjust the heating process. These features, along with preset limitations of selected parameters, will allow the RF energy conveyor oven to operate in fully automatic mode with no operator in attendance for a pre-selected product. A heating or pasteurization process electronic data file may be stored in a memory device for each type of food product. The data file would include cooking or pasteurization routine data for the particular food product that could be initiated with operator input of a product code.

Because of the high power levels (typically tens tc hundreds of kilowatts) and nature of the heating process in the RF conveyor oven, control effectiveness is absolutely vital if the process is to remain safe to both the product and the operator of the oven. Cooking meat involves the melting of animal fats. This means that the fatty residues present in the meat are heated to the melting point and so liberated as a high temperature fluid. In this fluid state the fats are volatile and fairly easily ignited, a situation that gets worse as the temperature increases until ignition occurs at which point the situation is completely uncontrolled. With microwave or RF heating there is a readily available source of sparks. If a metal object is placed within a microwave oven arcing occurs as that object assumes a high potential with respect to ground. This high potential is discharged to ground at the first opportunity and it is this discharge that is visible as an arc. In an RF oven the same mechanism exists, but there is another potential problem. As the load impedance changes the RF voltage across the electrodes also changes. In a product that liberates its fat and moisture content the impedance will almost always decrease If the power is adjusted to compensate with no impedance correction the electrode voltage will increase. This positive feedback loop will continue indefinitely or until the product bursts into flames. Ignition may be caused by over heating the product or by an arc resulting from the extreme voltage present across the electrode system leading to an arc, which ignited volatile gases being emitted by the overheated product. This is just one example of what can go wrong with any RF heating process. The best way to prevent this type of potential problem is to actively control the RF power source and the matching of it to the load.

Load matching in the present invention is achieved by the inclusion of an automatic matching network, as illustrated by variable impedance devices 24a, 24b, 24c and 24d in one example of the invention. This achieves a near perfect match by continually adjusting preferably two driven elements (both inductive or capacitive, or a combination of the two) in response to phase and magnitude errors in the output voltage and current waveforms. Whilst this ensures that maximum power transfer is maintained it does not control the RF power in response to changes in the load (product). As the loads heats (i.e., product cooks) the impedance of the load changes as described above. This change results in the automatic matching network making an adjustment to correct for the change, thus maintaining zero phase and magnitude error, which is not necessarily a good thing from a process point of view.

An example would be the need to raise the temperature of a product to a certain level and then maintaining that temperature for a period of time. For the present invention, it would be advantageous to reliably monitor the product temperature indirectly rather than by a contact thermometer as product 34 moves through a conveyor oven 10 of the present invention. In one example of the present invention monitoring of a number of operating parameters are used to control the temperature and therefore cooking of product 34 as it moves through the conveyor oven. During the cooking process a number of phenomena occur: the mass of the product is reduced due to the liberation of moisture and fat molecules; the temperature of the product increases; assuming a flow of air exists through the oven the temperature of that airflow increases with time; the moisture content of the airflow increases to a peak before decreasing; and the electrical impedance of the product decreases with both rising temperature and reducing moisture/fat content. All of these phenomena are indicators of the load's (product's) condition. Since most of them have a characteristic profile or have a distinct positive or negative temperature coefficient it is possible to develop an algorithm using these indicators to closely control the heating process. Cooking is essentially a means of partially "burning" a food product; it is necessary to raise the temperature of a product to a point sufficient to kill microbes and effect a change in texture and appearance. The RF conveyor oven of the present invention can be relied upon to raise the temperature of the product by the steep temperature gradient that can be achieved in a product composed of RF susceptible material. A more difficult task is controlling the RF cooking process closely enough so that it is possible to use the maximum power density possible for any given product. To maintain optimum performance of the oven, it is vital, as a minimum, to be able to monitor: oven RF voltage; in order to prevent arcing, product temperature; to prevent burning, moisture content; and to prevent over drying.

One example of the RF conveyor oven of the present invention utilizes a control system that monitors:

1. ambient air temperature in the tunnel (heating path) of the oven through which product is conveyed;
2. exhaust air temperature from the tunnel of the oven;
3. moisture content of input air into the tunnel of the oven
4. moisture content of exhaust air from the tunnel of the oven;
5. voltage of the high potential 1. electrodes (or potential difference between high potential and generally ground potential);
6. magnitude and phase of forward applied RF power from the RF power source;
7. magnitude and phase of reflected RF power from the load (to the RF power source);
8. capacitive distribution of the product between electrodes;
9. impedance value set in the variable impedance device; and
10. air flow velocity in the tunnel of the oven.

If necessary, product weight and/or product temperature at various positions as it passes through the conveyor oven can also be measured.

Moisture content of the input and output air with conventional sensors due is difficult to the fairly intense electromagnetic field and high RF voltage. A sensor was fabricated by use of a tuned circuit that utilizes an air-spaced coaxial capacitor. When the tuned circuit, formed by the coaxial capacitor and it's shunt inductance, is resonated at a crystal controlled frequency equal to the natural resonant frequency of the tuned circuit, the voltage developed across the tuned circuit is precision rectified and conditioned to provide a DC voltage level proportional to the produced RF voltage. As the "dry air" dielectric is replaced with moist air the dielectric constant of the circuit becomes greater, thus reducing the natural resonant frequency of the tuned circuit. As the tuned circuit resonant frequency decreases and the oscillator frequency remains constant (due to it being crystal controlled) the RF voltage developed across the tuned circuit also decreases. To compensate for temperature changes the sensor's surface temperature is monitored and compared against a calibration curve to compensate for temperature errors. This can be accomplished, for example, by use of a "lookup table" for calibration curve data stored in computer memory. Monitored sensor temperature can be compared with data from the lookup table to derive a calibration factor to compensate for temperature errors. The sensor head is of very simple design and has no components in contact with the airflow. The sensor is able to survive large temperature variations, high levels of relative humidity and contact with the various emissions present from the process, which may include surface contaminants such as animal fats.

The temperature of the product may be monitored as it moves through the conveyor oven by use of one or more light sources and fiber optical sensors. For this temperature monitoring method the wavelength of light directed from a light source onto the surface of the product is reflected back to a fiber optical sensor which is connected to a circuit that determines the surface temperature of the product from the phase shift of the reflected light.

Utilizing a heating process control system as described above allows automated control that is accurate and repetitive for multiple items of the same product. A heating process, as defined by a cooking process recipe, could be tightly controlled and repeated for each type of product. Operator input is reduced to an absolute minimum removing potential for mistakes, and the process can now be monitored live providing real-time quality monitoring of the process and product.

Whilst the invention is described to a large extent as being useful for heating a food product, it should be appreciated that it can be equally applied to other types of products that exhibit a change in impedance as they are heated.

The foregoing embodiments do not limit the scope of the disclosed invention. The scope of the disclosed invention is further set forth in the appended claims.

What is claimed is:

1. An oven for heating a product, the oven comprising:
   a conveyor apparatus to convey the product through the oven;
   one or more first electrodes;
   one or more second electrodes, the one or more second electrodes disposed relative to the one or more first electrodes to form a heating path between the one or more first electrodes and the one or more second electrodes through which the product is conveyed on the conveyor apparatus;
   one or more variable impedance devices, each of the one or more variable impedance devices having an adjustable impedance, and an input and an output, the output of an each one of the one or more variable impedance devices exclusively connected to at least one of the one or more first electrodes;
   an at least one adjustable length electrode feeder connecting the output of at least one of the one or more variable impedance devices to at least one of either the one or more first or second electrodes, whereby the distance between the at least one of either the one or more first or second electrodes and the product can be adjusted as the impedance of the adjustable length feeder is changed;
   one or more power sources, each of the one or more power sources having an RF power output, the RF power output of each one of the one or more power sources exclusively connected between the input of at least one of the one or more variable. impedance devices and at least one of the one or more second electrodes, the RF power output of each of the one or more power sources supplying RF power with a potential difference between the one or more first electrodes and the one or more second electrodes to radiate a RF energy between the one or more first electrodes and the one or more second electrodes, the RF energy to heat the product as the product is conveyed through the heating path; and
   whereby heating of the product is controlled by varying the adjustable impedance of each of the one or more adjustable impedance devices in an each circuit formed by one of the one or more power sources, one of the one or more variable impedance devices or the at least one adjustable length electrode feeder and the one of the one or more variable impedance devices associated with the at least one adjustable length electrode feeder, one or more first electrodes and one or more second electrodes, as the product is conveyed through the heating path.

2. The oven of claim 1 wherein the adjustable impedance of each of the one or more adjustable impedance devices is varied as the product is conveyed through the heating path to maintain a substantially constant impedance of the each circuit formed by one of the one or more power sources, one of one or more variable impedance devices or the at least one adjustable length electrode feeder and the one of the one or more variable impedance devices associated with the at least one adjustable length electrode feeder, one or more first electrodes and one or more second electrodes.

3. The oven of claim 1 wherein the distance between the at least one of either the one or more first or second electrodes associated with the at least one adjustable length electrode feeder and the product is varied as the product is conveyed through the heating path.

4. The oven of claim 1 wherein the adjustable impedance of each of the one or more adjustable impedance devices and the distance between the at least one of either the one or more first or second electrodes associated with the at least one adjustable length electrode feeder and the product are varied as the product is conveyed through the heating path to maintain a substantially constant impedance of the each circuit.

5. The oven of claim 1 further comprising a controller, the controller varying the adjustable impedance of each of the one or more adjustable impedance devices and varying the length of the adjustable length electrode feeder apparatus, responsive to one or more operating parameters of the oven.

6. The oven of claim 1 further comprising an air moisture content sensor exposed to an RF voltage for sensing moisture of the air entering or leaving the heating path, the sensor comprising:
   a tuned circuit comprising an air-spaced coaxial capacitor connected in parallel with a shunt inductance;
   a frequency source operating at the natural resonant frequency of the tuned circuit to resonant the tuned circuit; and
   a rectifier means connected across the tuned circuit to produce a rectified dc output voltage proportional to the RF voltage and calibrated to the moisture content of the air;
   whereby as moisture of the air varies the dielectric constant of the air-spaced capacitor changes to produce a change in the rectified dc output voltage.

7. The oven of claim 1 further comprising a temperature sensor for monitoring the temperature of the product as the product is conveyed through the heating path, the temperature sensor comprising a fiber optical light source and light sensor, whereby the phase shift of light transmitted from the light source to the surface of the product and reflected to the light sensor is proportional to the temperature of the product.

8. The oven of claim 1 wherein the one or more first electrodes are offset from the one or more second electrodes whereby the radiated RF energy produces a skewed energy distribution relative to the direction of travel of the product in the heating path.

9. The oven of claim 1 wherein the conveyor apparatus comprises:
   a first conveyor belt;
   a second conveyor belt disposed relative to the first conveyor belt so that the heating path is between said the first conveyor belt and the second conveyor belts; and
   a drive apparatus to drive the first conveyor belt and second conveyor belt whereby the product positioned at a first end of the heating path will be conveyed through the heating path by contact with at least one of the first or second conveyor belts.

10. A conveyor oven having a plurality of heating zones for heating a product with variable impedance, the oven comprising:
   a first conveyor belt;
   a second conveyor belt disposed relative to said first conveyor belt to establish a heating path between the first and second conveyor belts;
   a drive apparatus to drive the first conveyor belt and second conveyor belt whereby the product positioned at a first end of the heating path will be conveyed through the heating path by contact with at least one of the first or second conveyor belts;
   a one or more first electrodes for an each one of the plurality of heating zones, the one or more first electrodes disposed below the surface of the first conveyor belt opposing a surface of the first conveyor belt forming a first boundary of the heating path;
   a one or more second electrodes for the each one of the plurality of heating zones, the one or more second electrodes disposed above the surface of the second conveyor belt opposing a surface of the second conveyor belt forming a second boundary of the heating path;
   a one or more variable impedance devices for the each one of the plurality of heating zones, each one of the one or more variable impedance devices having an adjustable impedance, and an input and an output;
   an adjustable length electrode feeder apparatus connecting the output of an each one of the one or more variable impedance devices to either at least one of the one or more first or second electrodes, whereby the distance between the one or more first and second electrodes can be adjusted as the impedance of the adjustable length feeder is changed;
   and an at least one power source for the each one of the plurality of heating zones, the at least one power source having an RF power output, the RF power output connected between the input of the one or more variable impedance devices for the each one of the plurality of heating zones associated with the at least one power source, and either at least one of the one or more first or second electrodes not connected to the adjustable length feeder apparatus, the RF power output of each of the one or more power sources supplying RF power with a potential difference between the one or more first electrodes and the one or more second electrodes to radiate a RF energy between the one or more first electrodes and the one or more second electrodes, the RF energy to heat the product as the product is conveyed between the one or more first and second electrodes in the each one of the plurality of heating zones;
   whereby the heating of the product in the each one of the plurality of heating zones is controlled by varying the adjustable impedance of each of the one or more variable impedance devices and varying the length of the adjustable length feeder apparatus in an each circuit formed by the at least one power source, the one or more variable impedance devices, the adjustable length electrode feeder apparatus, the one or more first electrodes and the one or more second electrodes associated with the each one of the plurality of heating zones, as the product is conveyed between the one or more first and second electrodes in the each one of the plurality of heating zones.

11. The oven of claim 10 wherein the adjustable impedance of each of the one or more variable impedance devices for the each one of the plurality of heating zones and the length of the adjustable length electrode feeder is varied as the product is conveyed between the one or more first and second electrodes in the each one of the plurality of heating zones to maintain a substantially constant impedance of the each circuit.

12. The oven of claim 10 further comprising a controller, the controller varying the adjustable impedance of each of the one or more adjustable impedance devices and varying the length of the adjustable length electrode feeder apparatus, responsive to one or more operating parameters of the oven.

13. The oven of claim 10 further comprising an air moisture content sensor exposed to an RF voltage for sensing moisture of the air entering or leaving the heating path, the sensor comprising:
  a tuned circuit comprising an air-spaced coaxial capacitor connected in parallel with a shunt inductance;
  a frequency source operating at the natural resonant frequency of the tuned circuit to resonant the tuned circuit; and
  a rectifier means connected across the tuned circuit to produce a rectified dc output voltage proportional to the RF voltage and calibrated to the moisture content of the air;
  whereby as moisture of the air varies the dielectric constant of the air-spaced capacitor changes to produce a change in the rectified dc output voltage.

14. The oven of claim 10 wherein the one or more first electrodes are offset from the one or more second electrodes whereby the radiated RF energy produces a skewed energy distribution relative to the direction of travel of the product in the heating path.

15. A method of heating a product in an oven comprising the steps of:
  conveying the product through a heating path in one or more heating zones of the oven;
  subjecting the product to an RF energy as the product is conveyed through the heating path, the RF energy produced by an RF power source and radiated between one or more first electrodes and one or more second electrodes disposed on opposing sides of the product as the product is conveyed through the heating path;
  adjusting the impedance of a circuit formed by the RF power source and the one or more first and second electrodes by a variable impedance means inserted in the circuit as the product is conveyed through the heating path: and
  adjusting the impedance of a second circuit formed by the RF power source, one of the variable impedance means, and an adjustable length electrode feeder apparatus attached to one of the one or more first electrodes or one or more of the second electrodes by varying the length of the adjustable length electrode feeder apparatus to vary the distance between the one or more first electrodes or one or more second electrodes and to vary the impedance of the adjustable length feeder.

16. The method of claim 15 further comprising the steps:
  measuring the ambient air temperature in the heating path; measuring the exhaust air temperature from the heating path; measuring the moisture content of input air into the heating path;
  measuring the moisture content of exhaust air into the heating path; measuring the voltage across the one or more first electrodes and the one or more second electrodes;
  measuring the magnitude and phase of forward applied RF power from the RF power source;
  measuring the magnitude and phase of reflected RF power to the RF power source;
  measuring the capacitive distribution of the product between the one or more first and second electrodes;
  measuring the impedance set in the variable impedance means;
  measuring air flow velocity in the tunnel of the oven; and
  processing the ambient air temperature measurement, the exhaust air temperature measurement, the moisture content of input air measurement, the moisture content of exhaust air measurement, the voltage across the one or more first electrodes and the one or more second electrodes measurement, the magnitude and phase of forward applied RF power measurement, the magnitude and phase of reflected RF power measurement, the capacitive distribution of the product measurement, the impedance set in the variable impedance means measurement, and the air flow velocity measurement to adjust the RF energy and the impedance of the circuit.

* * * * *